United States Patent [19]

Huslander et al.

[11] 3,848,638

[45] Nov. 19, 1974

[54] PIPE REPAIR CLAMP

[75] Inventors: William L. Huslander; Charles J. Glover, both of Bradford, Pa.

[73] Assignee: Dresser Industries, Inc., Dallas, Tex.

[22] Filed: May 24, 1973

[21] Appl. No.: 363,694

[52] U.S. Cl. .................................. 138/99, 24/279
[51] Int. Cl. ............................................ F16l 55/16
[58] Field of Search ......... 138/99; 277/101; 24/279, 24/280, 281, 282, 284; 285/367, 410, 419, 420, 197, 198, 199, 138

[56] References Cited
UNITED STATES PATENTS

| | | | |
|---|---|---|---|
| 1,635,783 | 7/1927 | Goodall | 24/284 |
| 3,088,185 | 5/1963 | Smith | 138/99 X |
| 3,089,212 | 5/1963 | Graham et al. | 138/99 X |
| 3,151,632 | 10/1964 | Risley et al. | 138/99 |

*Primary Examiner*—Charles A. Ruehl
*Attorney, Agent, or Firm*—Daniel Rubin

[57] ABSTRACT

A pipe repair clamp affording wide range of circumferential adjustment to accommodate dimensional variations from nominal pipe size. A flexible band is adapted to partially encircle a pipe section on which it can be drawn tight by means of bolt adjustable lug assemblies secured at each end. The band supports a resilient gasket on its inner face while a spanner element is secured by the band ends to bridge the circumferential gap therebetween. Longitudinally secured to the spanner element centrally intermediate the lugs is a spanner bar serving both as an anchor for one end of the lug adjustment bolts and as a base to resist turning moment of the lugs when the latter are tightened during installation of the clamp onto a pipe.

10 Claims, 5 Drawing Figures

3,848,638

PIPE REPAIR CLAMP

BACKGROUND OF THE INVENTION

1. The field of art to which the invention pertains includes the art of piping and to external repair products therefor.

2. Pipe repair clamps are a widely used product available from a variety of commerical sources. They are available in virtually all size ranges for all sorts of piping materials to enable repair of pipe on site without replacement of the damaged portion. In this manner, repair can be effected without interrupting line service and without the significantly higher costs normally associated with replacing the pipe section in need of repair. One frequent application for such clamps is in the repair of buried underground pipe mains carrying water, gas or the like and for which an excavation is required to provide access to the repair site.

To insure leak-tight installation with these clamps, they should be capable of affording peripherally uniform gasket pressure without bulges or gaps through which a leak path could develop. Consequently, clamps for relatively larger pipe sizes on the order of about 2 inches and above are frequently sized essentially to fit, providing little latitude in accommodating dimensional variations in the pipe circumference, thereby avoiding bulges or gaps that might otherwise occur. Such constructions are exemplified by the repair clamp of U.S. Pat. No. 3,151,632 in which a wrap-around band is tightened by bolt adjustable lug assemblies interengaging with each other. In that arrangement, the lugs overlie an arcuate spanner element bridging the gap between band ends at one location about the circumference of the clamp. For convenience of installation, the lugs are normally situated about the pipe where most conveniently accessible to the repairman and, in the case of underground piping, usually facing the top of the excavation. Where wide range of adjustment is desired, it has been common to employ a split band utilizing dual lug assemblies 180° displaced, as for example disclosed in U.S. Pat. No. 3,089,212.

While wide adjustment clamps of the foregoing type are known to function well in their repair capacity, the dual lug assemblies incur the undesirable aspect of invariably increasing both the weight and cost of the clamp. Where applied to underground piping at some remote location via an excavation about the repair site, the increased weight of the large sizes becomes most difficult to handle by the average workman. Moreover, the dual arrangement inherently prevents top access to both lug assemblies usually requiring an enlarged excavation for access to the other lug assembly. As might be expected, this difficulty has rendered the associated labor of installation disproportionately more difficult, less reliable and usually more costly. Despite recognition by the trade, it has not been known heretofore how to construct a reliable wide adjustment repair clamp substantially eliminating the aforementioned difficulties. Previous attempts to afford wide range adjustment from a singular lug site has been generally unacceptable because of gasket bunching or the like likely to result. Reliability of repair under those circumstances has therefore been highly unpredictable.

SUMMARY OF THE INVENTION

This invention relates to novel construction for a wide adjustment pipe repair clamp. More specifically, the invention relates to such a repair clamp able to eliminate at least a significant portion of the added weight, cost and installation difficulties associated with similar purpose wide adjustment clamps of the prior art. This is achieved in accordance herewith by means of a repair clamp utilizing a one-piece integral band with spaced apart adjustment lugs localized for singular access on the circumference. A spanner element bridging the gap between the band ends supports a longitudinal spanner bar intermediate the lugs. Heads of the adjustment bolts are anchored to the spanner bar from which they extend bi-directionally to either of the respective lugs longitudinally situated along opposite sides thereof. With the bolts arranged head to head, total adjustment is series related, essentially affording double the range of that normally associated with one side location. At the same time, the spanner bar serves to resist turning moment of the torque arms while effectively transferring the force vestor of the turning moment to the underlying spanner element for increasing gasket load in the gap area. By virtue of locating the lugs at a singular site without need for dual lugs, lug weight is maintained at a minimum while installation problems for the repairmen are likewise minimized because of the total top access which only a singular lug site can afford.

It is, therefore, an object of the invention to provide a novel pipe repair clamp having wide adjustment capacity without the attendant deficiencies associated with similar purpose repair clamps of the prior art.

It is a further object of the invention to provide a novel pipe repair clamp as in the last mentioned object in which total adjustment capacity is circumferentially located at a singular lug site about the periphery of the clamp.

It is a still further object of the invention to provide a novel pipe repair clamp able to achieve wide range adjustment capacity with significantly less added weight, cost and installation difficulties than have typically been associated with similar purpose devices of the prior art as to substantially enhance versatility therefor.

Figure 2:
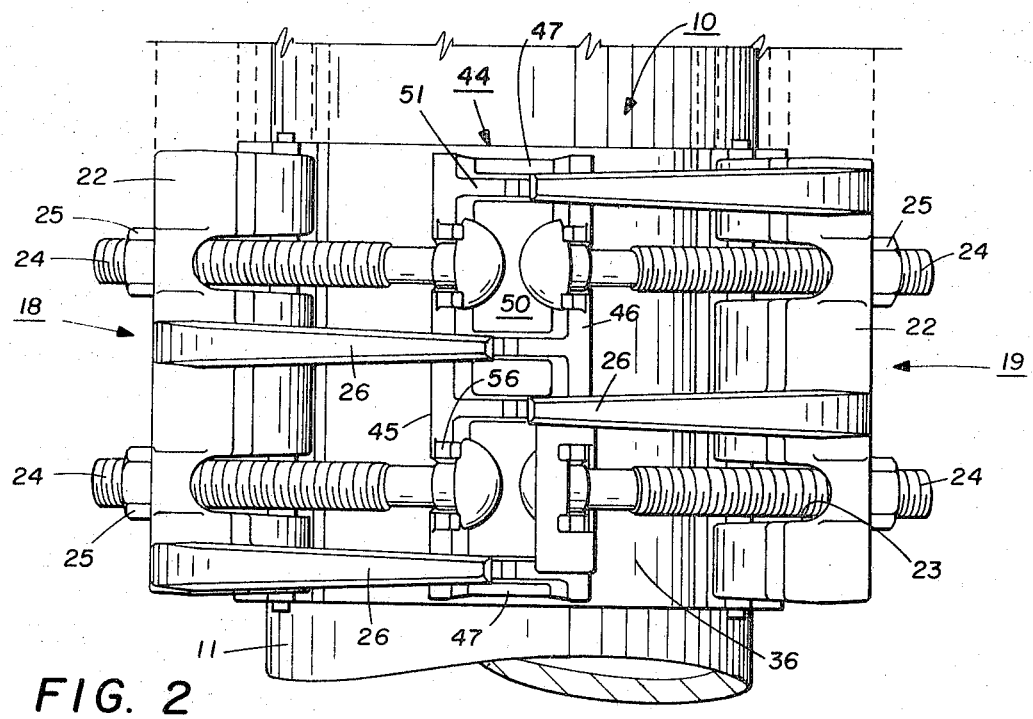
FIG. 2 is a top view of the repair clamp of FIG. 1.
Figure 1:
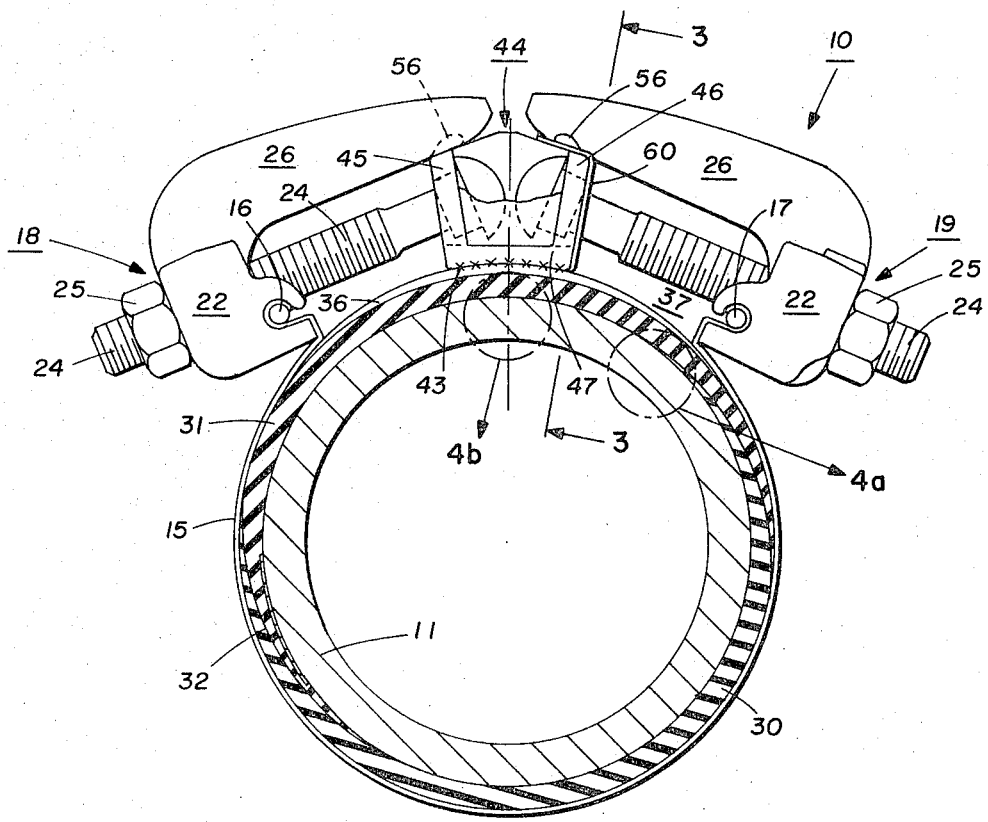
FIG. 1 is a front elevation partially in section of a pipe repair clamp in accordance herewith.
Figure 3:
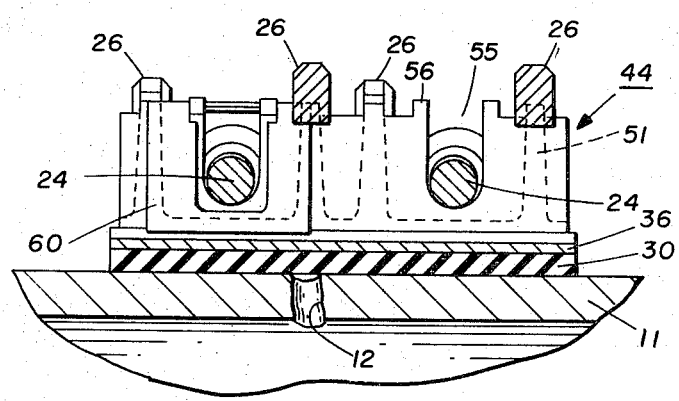
FIG. 3 is a sectional elevation taken substantially along the lines 3—3 of FIG. 1.

Referring now to the drawings, the pipe repair clamp in accordance herewith is designated 10 for encircling a section of pipe 11 having a leak or the like 12 to be repaired thereby.

Comprising the clamp is a one-piece flexible band 15, the opposite ends of which are anchored at 16 and 17 to lug sections 18 and 19 of predetermined longitudinal dimension as required. The lug section may, for example, be of a basic type disclosed in U.S. Pat No. 3,151,632 and is comprised of individual lug units 22, each defining an aperture 23 to receive an adjustment bolt 24 for threaded engagement with a nut 25. Formed integrally topside of the lug longitudinally adjacent the bolt aperture is a laterally integral torque arm 26, the undersurface of which extends substantially parallel to its bolt axis and away from the lug in the direction of takeup adjustment on the bolt. Preferably, the torque arms extend toward each other but longitudinally displaced and alternately staggered from the opposite lug sections.

Secured inwardly of band 15 along its inside face are preferably a two-piece arcuate gasket of sections 30 and 31, each locally secured to the band in a conventional manner and together forming a full circle for encircling pipe 11. The end edges of each gasket section are tapered as at 32 for overlying each other in a matching fit able to accommodate circumferential displacement therebetween consistent with diametral adjustment capacity of the clamp. Positioned on the inside face of band 15 glued to the gasket is a spanner plate 36 adapted on installation of the clamp to bridge a gap 37 between lugs for confining the gasket portion thereat. For reasons hereof, as will be understood, spanner plate 36 has a circumferential extent (arcuate length) substantially greater and generally twice that conventionally employed.

For anchoring the heads of bolts 24 while at the same time providing a base to receive the turning moments imposed by torque arms 26, there is provided a spanner bar 44 longitudinally secured to the top surface of the spanner plate as by welding at 43. The spanner bar is a generally inverted frusto-conical U-shaped section defined by radially extending upright sidewalls 45 and 46 merged integrally by a base 47. The underside of base 47 is slightly dished for accommodating the curvature of spanner plate 36. Longitudinally dividing the spanner bar into a plurality of open cavities 50 are a plurality of transverse integral webs 51, each in longitudinal alignment with a lateral torque arm 26 extending from one of the lug sections 18 or 19. Each web 51 serves to maintain structural integrity of the spanner bar while its top surface provides a base against which turning moment of the torque arm is applied during takeup adjustment of the clamp. Also formed in each sidewall of the spanner bar are a plurality of vertical slots 55, each longitudinally aligned with the facing bolt aperture 23 of the lug unit for accommodating adjustment bolts 24. With bolts 24 arranged head to head extending oppositely from their anchor location within spanner bar 44, approximately twice the normal adjustment range of the clamp is afforded by takeup adjustment in series of the individual bolts.

To prevent bolt workout during takeup tightening, a pair of integrally staked projections 56 are provided at each edge of the slot opening extending inwardly from the top surface of the sidewalls thereat. Likewise, a U-section metal spring clip 60 secured to the underside of the spanner bar positioned about alternate slot openings serves to prevent inadvertent dropout of loose bolts during shipment and/or assembly.

Figure 4:
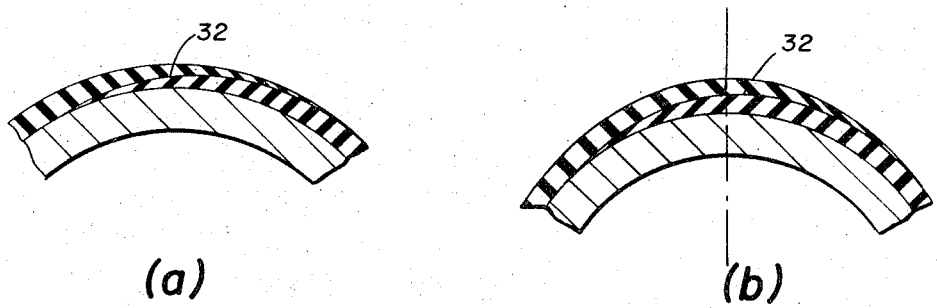
FIG. 4 is an enlarged fragmentary section of the encircled portion of FIG. 1 illustrating gasket overlap for the conditions of minimum and maximum adjustment respectively.

When in place about a pipe 11, tightening of nuts 25 for takeup of the lug units on their respective bolts in the manner described gradually tightens band 15 about gasket 30. As takeup continues the taper of the gasket ends 32 increase their overlap from the approximate minimum relationship of FIG. 4(a). For a one-piece rather than a two-piece gasket shown, the overlap continues to the more or less maximum relationship of FIG. 4(b). By this means, the tapered opposing ends of the gasket sections enable minimizing change in gasket thickness over the adjustment range. If the pipe is of maximum diameter, the overlapped ends provide principally uniform gasket thickness about the pipe circumference. For a pipe of minimum diameter, the gasket thickness is gradually increased and for a one-piece gasket maximum thickness occurs approximately at a mid point beneath spanner plate 36 underlying spanner bar 44.

Figure 5:
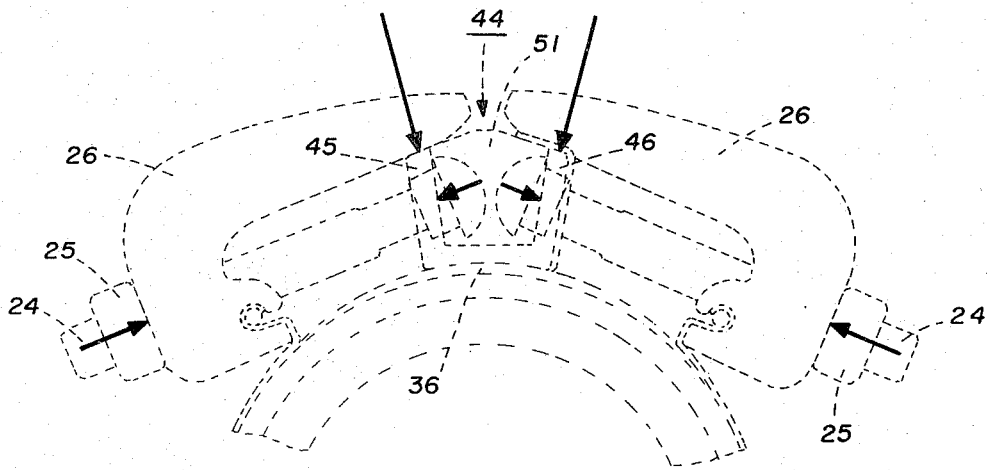
FIG. 5 is a fragmentary phantom outline duplicating FIG. 1 for the purpose of superimposing force diagrams thereon.

Likewise during takeup, the tendency of the torque arms to turn inward in response to tightening of nuts 25 is resisted by coincident web 51. This maintains the torque arms substantially parallel with a tangent to the pipe and parallel to the bolt axis whereby bending of the latter is prevented. The turning force resisted by spanner bar 44 is transmitted through its sidewalls 45 and 46 against the underlying spanner plate 36. Force transmission afforded thereby enables the substantially increased arcuate length of the spanner plate to receive locally intermediate support for maximum clamping pressure against the underlying gasket. Reference is made to FIG. 5 for an understanding of the force vectors in this relationship shown by solid arrows superimposed on a phantom outline of the clamp.

By the above description, there has been disclosed a novel pipe repair clamp affording a wide range of circumferential adjustment to accommodate dimensional variations from nominal pipe size. By virtue of total adjustment being afforded at a single circumferential site about the clamp, the adjustment lugs can be positioned for optimum access to the workman whereby to minimize if not eliminate the installation difficulties previously associated with similar purpose clamps of the prior art. At the same time, comparable wide adjustment capacity is obtained without doubling the numbe of lugs in the manner of the prior art, whereby weight increases as well as material cost increases are substantially minimized. These virtues have fulfilled a long felt need in rendering the clamp commercially competitive with those repair clamps in which wide adjustment capacity is not contained.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privelege is claimed are defined as follows:

1. In a pipe repair clamp including a flexible band for encircling a substantial circumferential portion of pipe section to be repaired, lug means secured to each of the circumferential opposing ends of said band, held bolt fasteners engageable with said lug means on the respective band ends and adapted to apply a generally circumferentially effective first force for tightened installation takeup of said band about a contained pipe section, a spanner plate positioned circumferentially encircling a portion of pipe section between the opposing ends of said band and gasket means circumferentially underlying said band and spanner plate for engagement against the peripheral surface of a contained pipe section, force applicator means adapted to cooperate with said lug means and responsive to tightened installation takeup of said band to apply a second force separately effective from said first force for locally increasing radially inward clamping force between said gasket and said spanner plate at a location on said spanner plate circumferentially intermediate said lug means.

2. In a pipe repair clamp according to claim 1 in which said force applicator means comprises a spanner bar supported longitudinally on said spanner plate.

3. In a pipe repair clamp according to claim 2 in which said spanner bar includes means to anchor one end of said bolt fasteners and from which the bolt fasteners extend bi-directionally therefrom to respective lug means.

4. In a pipe repair clamp according to claim 3 in which half of the bolt fasteners extend from said spanner bar in one direction to first of said lug means and half of the bolt fasteners extend from said spanner bar in the opposite direction to second of said lug means.

5. In a pipe repair clamp according to claim 4 in which said bolt fasteners are substantially aligned in pairs with one of each pair extending on one direction to the first of said lug means and the other of each pair extending in the opposite direction to the second of said lug means.

6. In a pipe repair clamp according to claim 5 in which said spanner bar is fixedly attached to said spanner plate at an arcuately intermediate location thereon and is generally U-shaped in cross section defining a centrally open cavity in which to receive one end of said bolt fasteners.

7. In a pipe repair clamp according to claim 6 in which the longitudinal side walls of said U-shape spanner bar extend substantially radially from the supporting surface of said spanner plate.

8. In a pipe repair clamp according to claim 6 in which said lug means includes torque arms integrally extending from the lug portion thereof to the vicinity of said spanner bar and said spanner bar includes means defining a bearing surface engageable by an extended portion of said torque arms for said bearing surface to resist the takeup turning moment thereof.

9. In a pipe repair clamp according to claim 8 in which each of said lug means includes a plurality of longitudinally spaced apart torque arms laterally engaging said spanner bar with the torque arms of the opposite lug means being alternately staggered with respect to each other.

10. In a pipe repair clamp according to claim 8 in which said bearing surface defining means comprises a plurality of longitudinally spaced webs extending transversely in said spanner bar cavity at coincident locations of said torque arms.

* * * * *